(12) United States Patent
Kammer et al.

(10) Patent No.: US 7,591,020 B2
(45) Date of Patent: Sep. 15, 2009

(54) LOCATION BASED SECURITY MODIFICATION SYSTEM AND METHOD

(75) Inventors: David Kammer, Seattle, WA (US); Ray Combs, San Jose, CA (US)

(73) Assignee: Palm, Inc., Sunnyvale, CA (US)

(*) Notice: Subject to any disclaimer, the term of this patent is extended or adjusted under 35 U.S.C. 154(b) by 1252 days.

(21) Appl. No.: 10/053,013

(22) Filed: Jan. 18, 2002

(65) Prior Publication Data
US 2003/0140246 A1 Jul. 24, 2003

(51) Int. Cl.
*G06F 11/30* (2006.01)

(52) U.S. Cl. .............. 726/26; 726/1; 726/2; 726/27; 713/1; 713/100; 380/258; 455/456.1; 455/456.3; 455/410; 709/225; 709/229

(58) Field of Classification Search ............... 713/201, 713/169, 200, 1, 100; 709/220, 223, 225, 709/227; 342/450, 457; 726/2, 26, 27, 9, 726/1; 380/258; 455/456.1
See application file for complete search history.

(56) References Cited

U.S. PATENT DOCUMENTS

| | | | |
|---|---|---|---|
| 4,956,769 A | 9/1990 | Smith | |
| 5,010,547 A | 4/1991 | Johnson et al. | |
| 5,012,219 A | 4/1991 | Henry | |
| 5,075,684 A | 12/1991 | DeLuca | |
| 5,359,317 A | 10/1994 | Gomez et al. | |
| 5,394,140 A | 2/1995 | Wong et al. | |
| 5,430,436 A | 7/1995 | Fennell | |
| 5,561,836 A | 10/1996 | Sowles et al. | |
| 5,612,682 A | 3/1997 | DeLuca et al. | |
| 5,640,452 A | 6/1997 | Murphy | |
| 5,650,776 A | 7/1997 | Mitchell et al. | |
| 5,705,995 A | 1/1998 | Laflin et al. | |
| 5,903,852 A | 5/1999 | Schaupp, Jr. et al. | |
| 5,922,073 A | 7/1999 | Shimada | |
| 5,930,801 A | 7/1999 | Falkenhainer et al. | |
| 5,958,006 A | 9/1999 | Eggleston et al. | |
| 5,991,405 A | 11/1999 | Mills | |
| 6,084,968 A * | 7/2000 | Kennedy et al. | 380/259 |
| 6,130,947 A | 10/2000 | Mizobe et al. | |
| 6,157,630 A | 12/2000 | Adler et al. | |
| 6,208,991 B1 | 3/2001 | French et al. | |
| 6,246,376 B1 * | 6/2001 | Bork et al. | 343/760 |
| 6,308,273 B1 * | 10/2001 | Goertzel et al. | 726/9 |
| 6,370,629 B1 * | 4/2002 | Hastings et al. | 711/163 |
| 6,504,480 B1 * | 1/2003 | Magnuson et al. | 340/571 |
| 6,636,175 B2 * | 10/2003 | Russell et al. | 342/357.1 |
| 6,651,171 B1 * | 11/2003 | England et al. | 713/193 |
| 6,732,176 B1 * | 5/2004 | Stewart et al. | 709/227 |
| 6,778,837 B2 * | 8/2004 | Bade et al. | 455/456.1 |
| 6,801,777 B2 * | 10/2004 | Rusch | 455/452.2 |

(Continued)

*Primary Examiner*—Nasser G Moazzami
*Assistant Examiner*—Shanto M Abedin
(74) *Attorney, Agent, or Firm*—Foley & Lardner LLP (57) ABSTRACT

A method or system for providing a level of data security dependent on the location of the user of a wireless device is disclosed. One exemplary embodiment relates to a method of adjusting security for a network user node in communication with a network based upon the location of the node. The method is performed by determining the location of a network user node, selecting a single level of security from a group of more than two security levels based on the determined location, and modifying the security protection for the network user node based upon the selected level of security.

42 Claims, 3 Drawing Sheets

U.S. PATENT DOCUMENTS

| | | | |
|---|---|---|---|
| 6,813,503 B1 * | 11/2004 | Zillikens et al. | 455/457 |
| 6,898,628 B2 * | 5/2005 | Bade et al. | 709/217 |
| 6,931,130 B1 * | 8/2005 | Kraft et al. | 380/258 |
| 6,970,927 B1 * | 11/2005 | Stewart et al. | 709/225 |
| 7,020,772 B2 * | 3/2006 | England et al. | 713/166 |
| 7,051,196 B2 * | 5/2006 | Angelo et al. | 713/1 |
| 7,080,402 B2 * | 7/2006 | Bates et al. | 726/2 |
| 7,343,165 B2 * | 3/2008 | Obradovich | 455/456.1 |
| 2002/0023010 A1 * | 2/2002 | Rittmaster et al. | 705/26 |
| 2002/0138632 A1 * | 9/2002 | Bade et al. | 709/229 |
| 2002/0176579 A1 * | 11/2002 | Deshpande et al. | 380/270 |
| 2003/0061166 A1 * | 3/2003 | Saito et al. | 705/54 |
| 2003/0097586 A1 * | 5/2003 | Mok | 713/200 |
| 2004/0250069 A1 * | 12/2004 | Kosamo | 713/168 |

* cited by examiner

FIG. 2

| Location | Node Security | Default Security | Data Set Security 1 | Data Set Security 2 | ... |
|---|---|---|---|---|---|
| Home | | | | | |
| Office | | | | | |
| Shopping Mall | | | | | |
| Undetermined | | | | | |
| Default | | | | | |

320 { Undetermined
310 { Default

FIG. 3A

Home Coordinates:

Node:     Default:
Office:

FIG. 3B

LOCATION BASED SECURITY MODIFICATION SYSTEM AND METHOD

BACKGROUND

The disclosure relates generally to the field of wireless communication. More particularly, the disclosure relates to a method or system for providing a level of data security dependent on the location of the user of a wireless device.

Wireless networks, in general, have grown in both capability and use. More and more people rely on wireless devices in their professional and personal lives. Professionals often rely on wireless devices to have instant access to information while they are away from the office. Professionals use wireless devices to access email, calendars, contact lists, a company intranet, web-enabled applications, business and local news, and other information. Individuals often use wireless devices to stay in touch with friends and family and to access information which may aid them in their daily activities.

As people use wireless networks more, they are also more frequently storing and accessing sensitive data on portable devices and/or over wireless networks. This information can include personal information, financial information, or company confidential information. The information can either be stored on the remote portable device or it can be stored on a server and accessed using the remote portable device over a wireless network. Both the device and the transmission can be susceptible to interference, interception, or tampering.

A wide number of various techniques have evolved to try and protect the data that is stored on handheld devices and transmitted over wireless networks. Examples of the techniques include: authentication, authorization, encryption, and data integrity verification. Authentication refers to verification of the identity of a person or process from which a message, data request, or access request originates. Authorization refers to the process of determining what functionality or access to information is available to that particular person or process. Encryption refers to encoding information in such a manner such that the information is not decipherable by someone intercepting the information. Data integrity attempts to ensure that the data has not been modified or damaged during a transmission.

Unfortunately, providing security has costs associated with it. Generally in a network, data is sent in discrete units called "packets". Packets of data are generally required to be of fixed size by most current network protocols. If the data is being transmitted from a remote location, security information may be required on every packet sent and received from a handheld device. This allows less space for data in each individual packet. Thus, filling packets with security information has the effect of reducing the effective transmission rate. This reduction is especially noticeable on a wireless network where the transmission rates are already vastly slower compared to a wired network.

Even if data is not being sent over a remote network, providing security has costs. Authentication and authorization can require the user to enter a password every time the data needs to be accessed. The data will remain unlocked for a period of time, but security can require that the data be locked again after a period of time or on the happening of an event such as shutting off the handheld device. Encryption requires that the data be organized such that it is not normally readable. Unfortunately, this process takes time, and prior to accessing the information, the data must be decrypted. And then again, after the access is complete, the data must be re-encrypted.

Albeit security is important to protect information, especially sensitive information such as credit card numbers, financial information, or corporate proprietary information, however, the absolute highest level of security is not necessary at all times. For example, when in a shopping mall, it may be useful to be able to access personalized shopping information with only minimal security. Also, while the user is at the office, there may be no reason to provide heavy security for company proprietary information.

Accordingly, there is a need for a method or system for providing different levels of security for different subsets of data based on the location of a portable network node or portable electronic device. There is also an increased need to protect the data transmissions and the devices from any or all of interference, interception, and or tampering.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY OF THE INVENTION

One exemplary embodiment relates to a method of adjusting security for a network user node in communication with a network based upon the location of the node. The method is performed by determining the location of a network user node, selecting a single level of security from a group of more than two security levels based on the determined location, and modifying the security protection for the network user node based upon the selected level of security.

Another exemplary embodiment relates to a computer system for modifying security settings for a network user node based on the location of the node. The computer system includes a location sensing device having a communicative coupling with the system for determining the location of a network user node, a storage device for storing a table of security modifications to be performed according to one of a plurality of locations for the network user node, the security modifications including more than two levels, a processor coupled to a storage device for processing information, storing the information on a storage device, and generating a security modification instruction, and a communication device capable of transmitting a data signal to the network user node containing instructions to modify the security protection for the node.

Another exemplary embodiment relates to a method of adjusting security for a network user node having a processor, a memory coupled to the processor, a wireless transceiver, and a location determining device in communication with a network based upon the location of the node. The method includes receiving location information using a network user node, and using the network user node to modify security protection for data to a single level from a group of more than two levels based upon the location information.

Another exemplary embodiment relates to a system implemented on a network user node for modifying security settings based on the location of the node. The system includes a system for determining the location of the network user node coupled to the network user node, a processor for processing information, storing information on a storage device, and accessing a table of security modification instructions, the table including more than two unique security modifications, and a storage device coupled to the network user node for storing a table of security modifications to be performed based on a plurality of locations for the network user node. Alternative exemplary embodiments relate to other features and combination of features as may be generally recited in the claims.

BRIEF DESCRIPTION OF THE DRAWINGS

The invention is illustrated by way of example and not limitation using the figures of the accompanying drawings, in which the references indicate similar elements and in which.

DETAILED DESCRIPTION OF THE PREFERRED EMBODIMENTS

A system and method for using location information to change security settings for a mobile network node is described. In the following description, for purposes of explanation, numerous specific details are set forth to provide a through understanding of exemplary embodiments of the invention. It will be evident, however, to one skilled in the art that the invention may be practiced without these specific details. In other instances, structures and devices are shown in block diagram form to facilitate description of the exemplary embodiments.

Figure 1A:
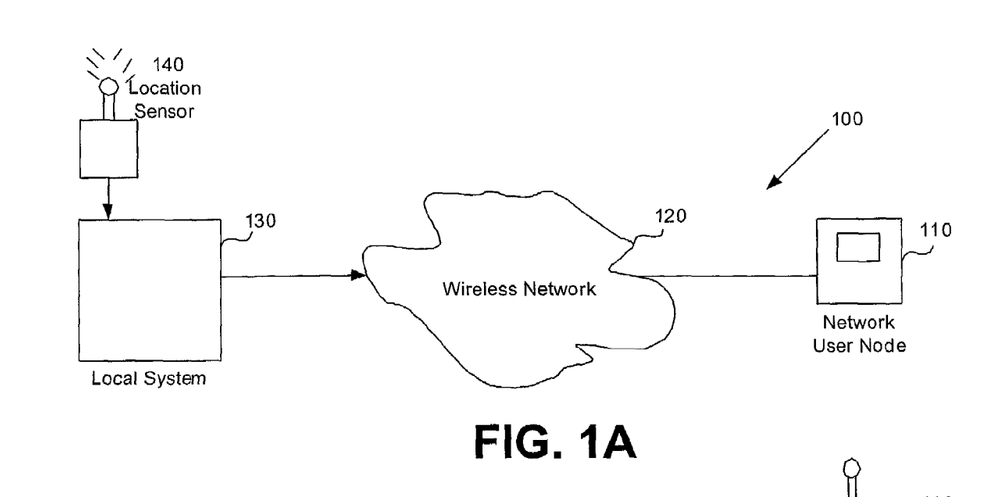
FIG. 1A is a general block diagram of a network user node in communication with a wireless network in accordance with an exemplary embodiment.

FIG. 1A is a general block diagram 100 of a network user node 110 (or multiple network user nodes 110) in communication over a wireless network 120 with a remote computing system 130 in accordance with an exemplary embodiment. In an exemplary embodiment, remote computing system 130 is associated with a location sensing system 140.

Network user node 110 can be a handheld computer, a handheld personal digital assistant, a laptop computer, a wireless cellular digital phone, a pager, or any other such device. Network user node 110 can be communicatively coupled to a wired or wireless network 120.

In an exemplary embodiment wireless network 120 is the Internet. In alternative embodiments, wireless network 120 is any type of network such as, a virtual private network, an intranet, an Ethernet, or a netware network. Further, wireless network 120 can include a configuration, such as, a wireless network, a wide area network (WAN) or a local area network (LAN).

Remote computing system 130 can be any computing system including a central processing unit (CPU), a storage device, and a communication system. Remote computing system 130 can be communicatively coupled to location sensing system 140. The communication between remote computing system 130 and location sensing system 140 can be achieved over a standard wired network, a wireless network, or any other communication system.

Location sensing system 140 can include a global positioning satellite system (GPS), an access node triangulation system, an access point sensing system, or any other system capable of detecting the location of network user node 110. Location sensing system 140 includes a communication system to transmit the location information to remote computing system 130.

Figure 1B:
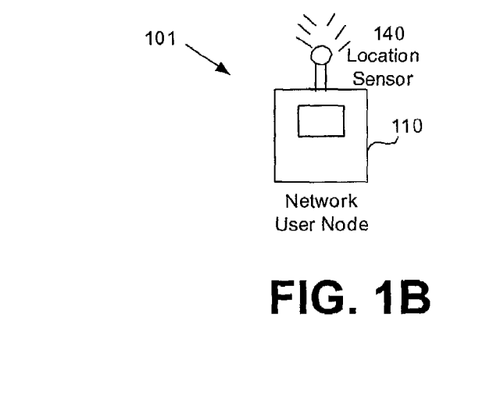
FIG. 1B is a general block diagram of a network user node with an associated location sensor system in accordance with an exemplary embodiment.

FIG. 1B is a general block diagram 101 of network user node 110 with associated location sensor system 140 in accordance with an exemplary embodiment. Diagram 101 illustrates an alternative embodiment, wherein network user node 110 is directly associated with location sensing system 140. In an exemplary embodiment location sensing system 140 is a GPS system. Location sensing system 140 can be any system capable of determining location and sending a data signal containing that information to network user node 110.

Figure 1C:
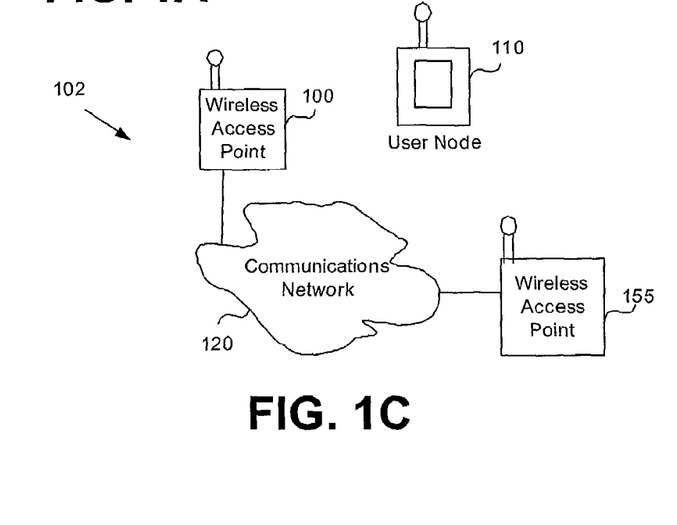
FIG. 1C is a general block diagram of a network user node in communication over a wireless network using wireless access points.

FIG. 1C is a general block diagram 102 of a network user node 110 in communication over wireless network 120 with wireless access point 150 and wireless access point 155. Wireless access points 150 and 155 may be but are not limited to IEEE 802.11 wireless access points, Bluetooth wireless access points, etc. Network user node 110 is in communication with wireless access points 150 and 155 over communications network 110. Network user node 110 can obtain location information based upon the location of the wireless access point that is being accessed over wireless network 110. In an exemplary embodiment, network user node 110 can receive timing information sent from wireless access point 150 to calculate the distance between the network user node 110 and wireless access point 150. Network user node 110 can perform the same process with wireless access point 155. Based upon stored location information and the distance from the two wireless access points, the location of network user node 110 can be determined. Alternatively location could be determined by determining the distance and direction of a signal received from just one of wireless access points 150 and 155. In a further alternative, a gross approximation of network user node 110 may be determined by using the known location of the access point 150 with which user node 110 can communicate.

Examples have been illustrated above for some exemplary embodiments for determining the location of network user node 110. These embodiments are shown for illustrative purposes only. Any method wherein the location of network user node 110 is determined with greater or lessor specificity is contemplated.

Figure 2:
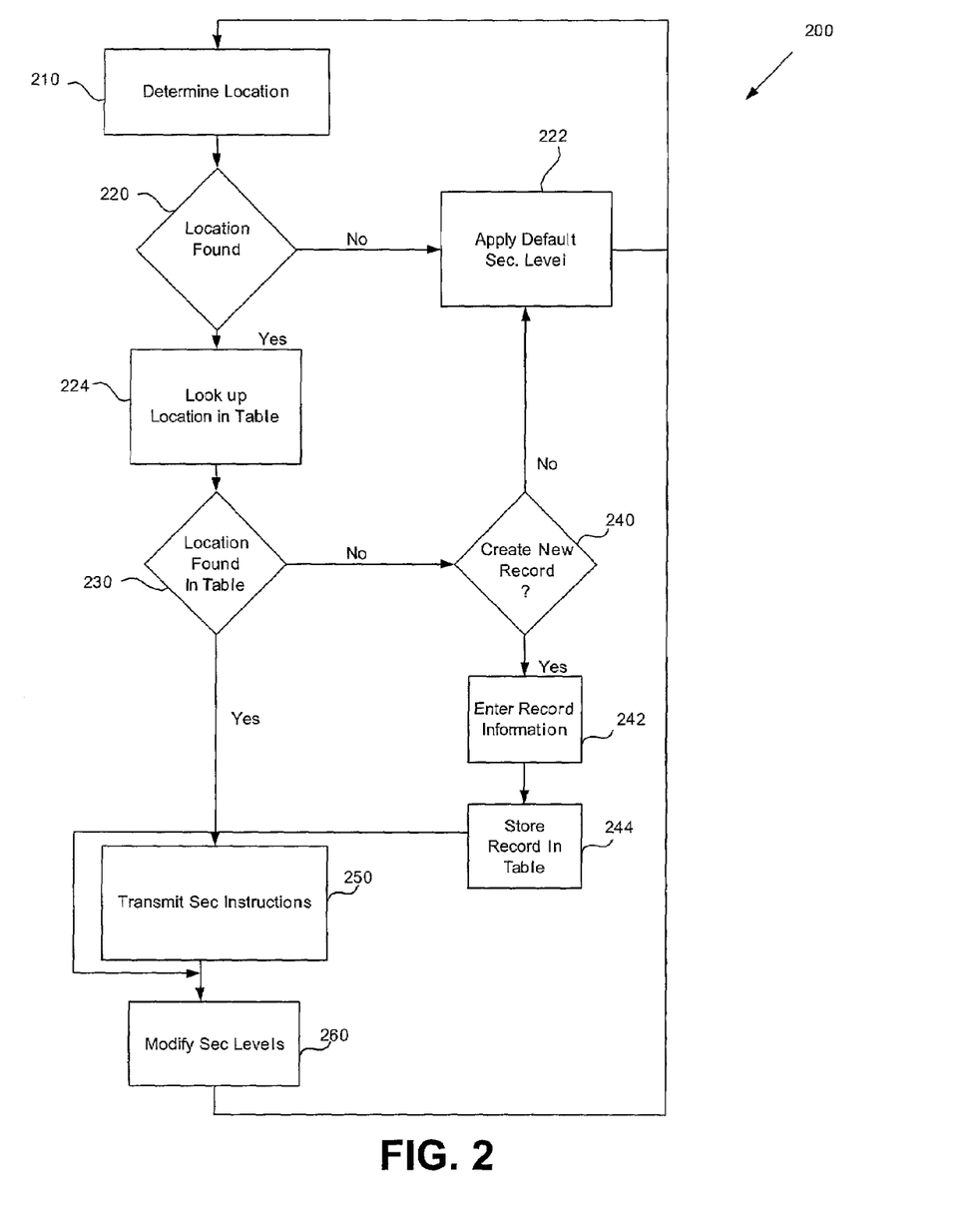
FIG. 2 is a flow diagram illustrating a process of using the location of a network user node to set security levels.

FIG. 2 illustrates a flow diagram 200 illustrating an exemplary embodiment of a method of using location information to update security settings on network user node 110.

In a step 210, the location of network user node 110 is obtained from location sensing system 140 or using wireless access points or an alternative location detection system. The network user node's location can be obtained using global positioning satellite (GPS) signals, information regarding the location of the current access point for the network user node, a signal triangulation method, or any other method capable of detecting the location of a network user node with greater or lesser specificity.

In a step 220 the location information is verified. If the location either could not be determined or is found to be an unacceptable value, network user node 110 could be configured to display a notice to this effect and apply default security settings for network user node 110 in a step 222. Following the application of the default security levels, step 210 is once again performed and an attempt to determine the location of network user node 110 is once again made. Alternatively, step 210 can be performed after an interval of time has passed or upon the occurrence of some event such as powering on network user node 110 or attempting to access new functionality or data.

If the location value is properly determined and is an acceptable value in step 220, a step 224 is performed wherein the location is referenced in a table 300 of security settings indexed by location, described below in reference to FIG. 3A. Table 300 can be stored on a storage apparatus in association either with remote computer system 130 in communication with network user node 110 over wireless network 120 or on a storage apparatus associated with network user node 110. Table 300 can be implemented using a processor and a storage means to create and store a series of records or a linked list. Alternatively table 300 can be implemented using a database or any other suitable method wherein information can be stored, indexed, and easily retrieved.

A determination is made in a step 230 to determine if the current location of network user node 110 is stored in table 300 of security settings indexed according to location. If the location is not found, an optional step 240 can be performed.

In step 240, a new record 350 described below in reference to FIG. 3B, can be created for storage in table 300. In step 240 the user is queried to determine if they want to create new record 350 containing security settings for the location determined in step 210. In one exemplary embodiment the user can be queried using a display associated with network user node 110. In an alternative embodiment the user can be queried using a series of communications sent from remote computing system 130 over wireless network 120 to network user node 110. The query would give the user location information and the user would have the option of setting at least one security level setting for that location from a set of more than two different security levels (i.e. the level of security is chosen from more than just security on or security off). The security level setting could include restrictions or complete blocks on access to either network user node 110 as a whole, information stored on the network user node 110, or any subset of information stored on the network user node 110. The security setting could also include restrictions or blocks on access to information available on a remote system accessible using network user node 110 over wireless network 120.

If the user does wish to create new record 350, a step 242 is performed wherein the information is gathered through the user interface of the network user node 110 and used to populate a new record 350 with an index based on the location information determined in step 210. In an exemplary embodiment, the user could have the option of expanding or shrinking the location setting to define the complete space wherein the new security settings should apply. Following the entry of the record information, a step 244 is performed wherein new record 350 is stored in table 300.

If the user does not wish to create new record 350 in step 240, the system will apply default security levels in a step 222. Following application of the default security levels the system and method will return to step 210 to once again determine the location of network user node 110. Alternatively, step 210 can be performed after an interval of time has passed or upon the occurrence of some event such as powering on network user node 110 or attempting to access new functionality or data.

If location was determined in step 220 and found in the table in step 230, an optional step 250 may be performed wherein instructions to update the security settings for network user node 110 are transmitted from remote computing system 130 over wireless network 120 to network user node 110. In alternative embodiments, illustrated above in reference to FIGS. 1B and 1C, this step is not required.

After the proper security instructions are obtained, a step 260 is performed wherein the security settings for network user node 110 are modified according to the information stored in the record. Following the update of the security settings, a step 210 is once again performed to determine the location of network user node 110. Step 210 can be performed immediately to create a continuous looping and updating of the security levels for network user node 110 based upon location, or alternatively the security settings can be updated after certain intervals of time, or the security settings can be updated upon the occurrence of some event such as a powering on of network user node 110 or attempting to access new data or functionality.

Figure 3A:
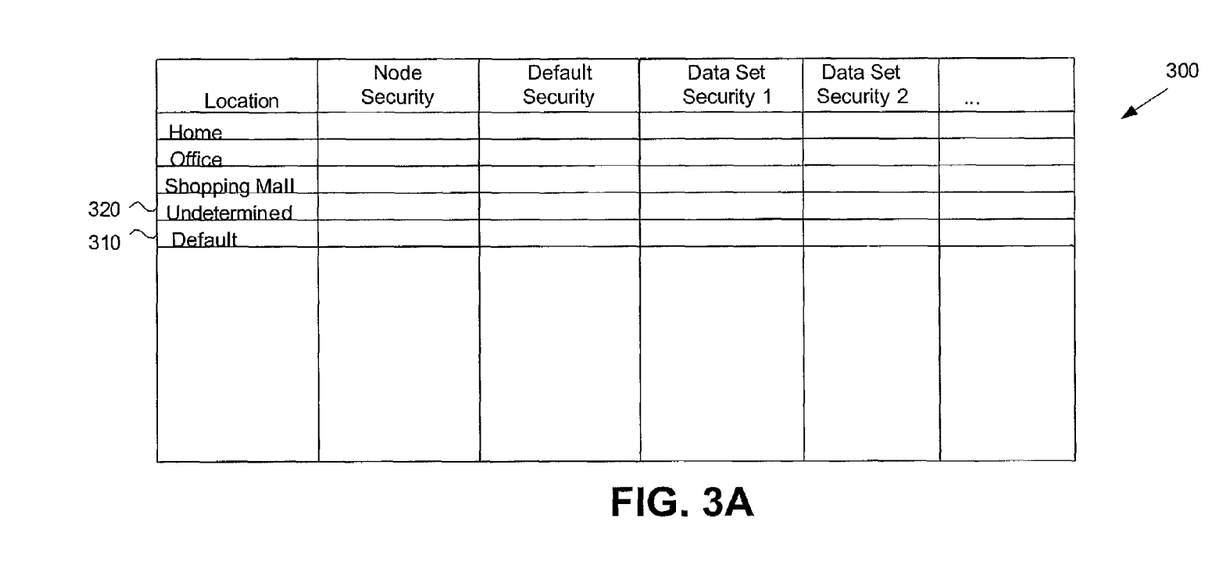
FIG. 3A is an exemplary embodiment of a table showing security level settings indexed by location.

FIG. 3A shows an exemplary embodiment of a table 300 for storing information regarding security settings for network user node 110 indexed according to location. This table can be stored on remote computing system 130. Alternative, table 300 can be stored on a storage apparatus associated with network user node 110.

Each entry in table 300 is represented by a record, described in detail below with reference to FIG. 3B. Table 300 represents a complete listing of all records that are stored on the storage system.

In addition to user defined records based upon location, table 300 stores a record 310 for default security settings. Record 310 is referenced in step 222, described above in reference to FIG. 2, to apply security settings when either the location is unknown or the location is known but not represent by a record in table 300. In an alternative embodiment, one record can be used when location is undetermined, while another can be used when location is not represented by a record stored in table 300.

Figure 3B:
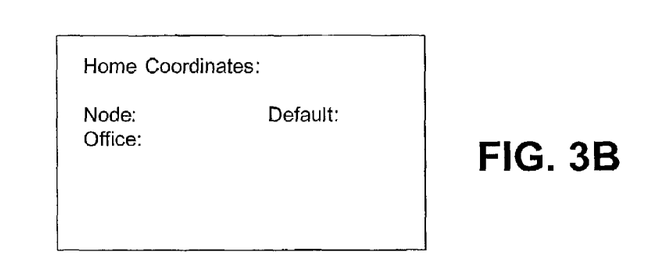
FIG. 3B is an exemplary embodiment of a record stored in the table shown in FIG. 3A.

FIG. 3B represents new record 350 for storing security level information to be associated with a location. Record 350 may contain several entry fields for storing information relevant to security level settings for any one particular location. In an exemplary embodiment record 350 contains entry fields for the name of the location, the coordinates of the location, the security settings for the network user node at that location, the default security settings for that location, the security settings for a subset of information at that setting and any other security information that the user may wish to associate with a given location. The location information stored in new record 350 can be a single point or a range wherein the security settings will apply.

While the detailed drawings, specific examples and particular formulations given describe exemplary embodiments, they serve the purpose of illustration only. The hardware and software configurations shown and described may differ depending on the chosen performance characteristics and physical characteristics of the computing devices. For example, the type of computing device, data structures, or devices used may differ. The systems and methods shown and described are not limited to the precise details and conditions disclosed. Furthermore, other substitutions, modifications, changes, and omissions may be made in the design, operating conditions, and arrangement of the exemplary embodiments and the steps of the exemplary embodiments without departing from the scope of the invention as expressed in the appended claims.

What is claimed is:

1. A method of adjusting security for a network user node in wireless communication with a network based upon the location of the node, comprising:

storing a table comprising a plurality of security settings indexed by location in the memory of the network user node;

determining the location of a network user node;
selecting a single level of security from the plurality of security settings stored in the table based on the determined location, wherein at least one of the plurality of security levels is a default security setting selected based at least on a determination that the table does not have a location corresponding to the determined location or based at least on the location of the network user node being unknown; and
modifying a security protection for the network user node based upon the selected level of security, wherein the step of modifying the security protection for the network user node includes modifying a data encryption parameter to change whether wireless data transmitted by the network user node will be encrypted,
wherein the determined location and the security protection for the network user node are updated repeatedly.

2. The method of claim 1, wherein the network user node is a mobile computing device having a display.

3. The method of claim 1, wherein the network user node's location is determined using a location sensing system.

4. The method of claim 3, wherein the location sensing system is a global positioning satellite (GPS) system.

5. The method of claim 3, wherein the location sensing system uses nearby access points to determine location.

6. The method of claim 3, wherein the location sensing system uses signal bouncing and triangulation to determine network user node location.

7. The method of claim 3 wherein the network user node is in direct communication with the location sensing system.

8. The method of claim 1, wherein the step of sending a data signal includes transmitting the data signal using a wireless local area network (WLAN) protocol.

9. The method of claim 8, wherein the WLAN protocol includes the IEEE 802.11 protocol.

10. The method of claim 8, wherein the WLAN protocol includes the Bluetooth wireless network protocol.

11. A method of claim 1, wherein the security levels are provided by the user of the network user node for a variety of locations.

12. A method of claim 1, wherein the security level is based on the type of location determined for the network user node.

13. The method of claim 1, wherein the step of modifying the security protection for the network user node includes restricting access to information unless a password is properly entered.

14. The method of claim 1, wherein the network user node is a portable handheld device.

15. A computer system for modifying security settings for wireless communications with a network user node based on the location of the node comprising:
an input device having a communicative coupling with a system for determining the location of a network user node;
a storage device for storing a table of security modifications to be performed based on a plurality of locations for the network user node, the security modifications including a plurality of levels, the security modifications being defined by a user of the network user node;
a processor configured to select a data encryption parameter based on the location and the table of security modifications to change whether wireless data transmitted by the computer system to the user node will be encrypted, wherein the processor is configured to select a default security setting if the location is not determined; and
a communication device capable of transmitting a data signal to the network user node based on the selected data encryption parameter;
wherein the location of the network user node and the security protection for the network user node are updated repeatedly.

16. The system of claim 15, wherein the network user node is a mobile computing device having a display.

17. The system of claim 15, wherein the system for determining the location of a network user node accesses and interprets global positioning satellite (GPS) signals.

18. The system of claim 15, wherein the system for determining the location of a network user node uses nearby access points to determine the location.

19. The system of claim 15, wherein the system for determining the location of a network user node uses signal bouncing and triangulation to determine location.

20. The system of claim 15, wherein the communication device transmits the data signal using a wireless local area network (WLAN) protocol.

21. The system of claim 20, wherein the WLAN protocol includes the IEEE 802.11 protocol.

22. The system of claim 20, wherein the WLAN protocol includes the Bluetooth wireless network protocol.

23. The system of claim 15, wherein the table stored on the storage device includes security levels customized based upon the type of location received from the system providing the location of the network user node.

24. The system of claim 15, wherein the network user node is a portable handheld device.

25. A method of adjusting security for a network user node having a processor, a memory coupled to the processor, a wireless transceiver, and a physical location determining device, wherein the network user node is in communication with a network based upon the physical location of the node, comprising:
storing a table comprising selectable encryption levels indexed by location for each of a plurality of locations in the memory of the network user node;
receiving physical location information using a network user node;
using the network user node to set security protection for wireless data communication to a default encryption level based at least on a determination that the table does not have a location corresponding to the received physical location or based at least on the location of the network user node being unknown; and
using a network user node to modify security protection for wireless data communication to an encryption level selected from the selectable encryption levels based upon the physical location information;
wherein the table is configurable by a user of the network user node; and
wherein the physical location information and the security protection for the network user node are updated repeatedly.

26. The method of claim 25, wherein the network user node is a mobile computing device having a display.

27. The method of claim 25, wherein the network user node sends and receives data over a wireless local area network (WLAN).

28. The method of claim 27, wherein the WLAN protocol includes the IEEE 802.11 protocol.

29. The method of claim 27, where the WLAN protocol includes the Bluetooth wireless network protocol.

30. The method of claim 25, wherein the network user node is a portable handheld device.

31. A system implemented on a network user node for modifying security settings based on the physical location of the node comprising:
- a system for determining the physical location of the network user node coupled to the network user node;
- a processor for processing information, storing information on a storage device, and accessing a table of security modifications, the table configured to store security modifications for more than two physical locations; and
- a storage device for storing the table of security modifications;
- wherein the network user node performs security modifications based on the physical location of the network user node, wherein the security modifications comprise modifying a data encryption parameter to change whether wireless data transmitted by the network user node will be encrypted, wherein a default security setting is selected based at least on a determination that the table does not have a location corresponding to the received physical location or based at least on the location of the network user node being unknown; and
- wherein the physical location and the performance of security modifications for the network user node are updated repeatedly.

32. The system of claim 31, wherein the network user node is a mobile computing device having a display.

33. The system of claim 31, wherein the system for determining the physical location of the network user node accesses and interprets global positioning satellite (GPS) signals.

34. The system of claim 31, wherein the system for determining the physical location of the network user node uses nearby access points to determine location.

35. The system of claim 31, wherein the system for determining the physical location of the network user node uses signal bouncing and triangulation to determine location.

36. The system of claim 31, wherein the network user node can transmit and receive data signals using a wireless local area network (WLAN) protocol.

37. The system of claim 36, wherein the WLAN protocol includes the IEEE 802.11 protocol.

38. The system of claim 36, wherein the WLAN protocol includes the Bluetooth wireless network protocol.

39. The system of claim 31, wherein the table stored on the storage device includes user defined protection settings based on at least one physical location.

40. The system of claim 31, wherein the table stored on the storage device includes protection settings customized based upon the type of location of the network user node.

41. The system of claim 31, wherein the network user node system modifies information access restrictions based upon a security modification associated with the physical location of the network user node.

42. The system of claim 31, wherein the network user node is a portable handheld device.

* * * * *

UNITED STATES PATENT AND TRADEMARK OFFICE
CERTIFICATE OF CORRECTION

| | |
|---|---|
| PATENT NO. | : 7,591,020 B2 |
| APPLICATION NO. | : 10/053013 |
| DATED | : September 15, 2009 |
| INVENTOR(S) | : Kammer et al. |

Page 1 of 1

It is certified that error appears in the above-identified patent and that said Letters Patent is hereby corrected as shown below:

On the Title page,

[*] Notice: Subject to any disclaimer, the term of this patent is extended or adjusted under 35 USC 154(b) by 1252 days Delete the phrase "by 1252 days" and insert -- by 1923 days --

Signed and Sealed this

Twenty-fourth Day of August, 2010

David J. Kappos
*Director of the United States Patent and Trademark Office*